F. S. HOOKER.
SHOCK ABSORBING DEVICE.
APPLICATION FILED JAN. 13, 1916.
1,185,671.
Patented June 6, 1916.
2 SHEETS—SHEET 2.
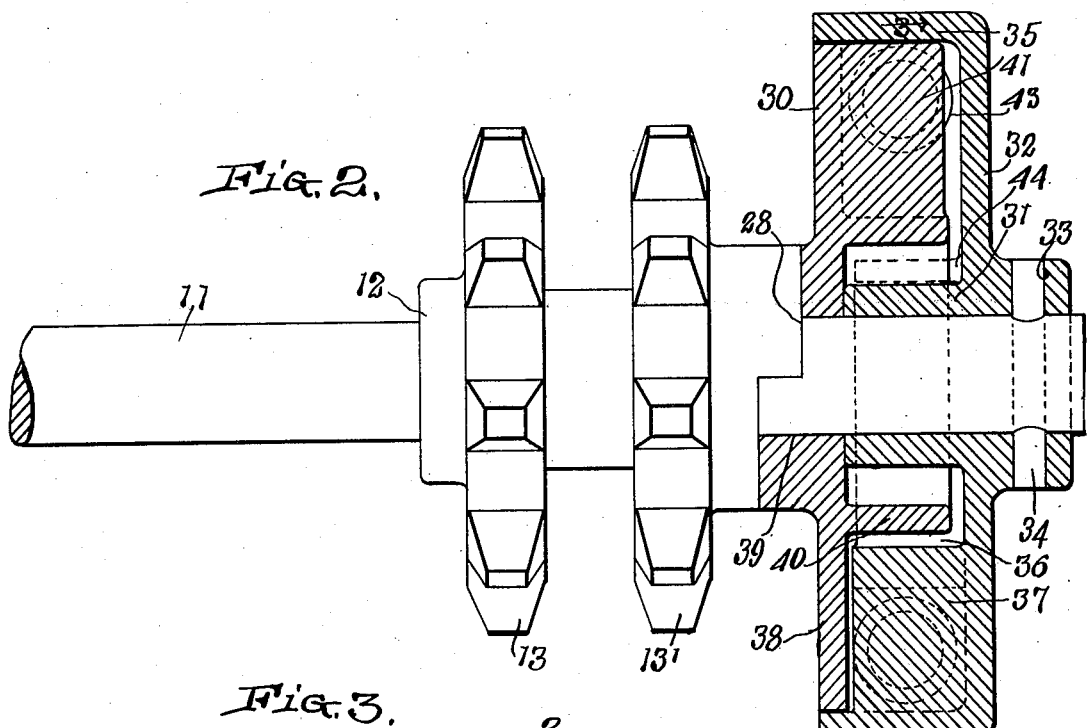
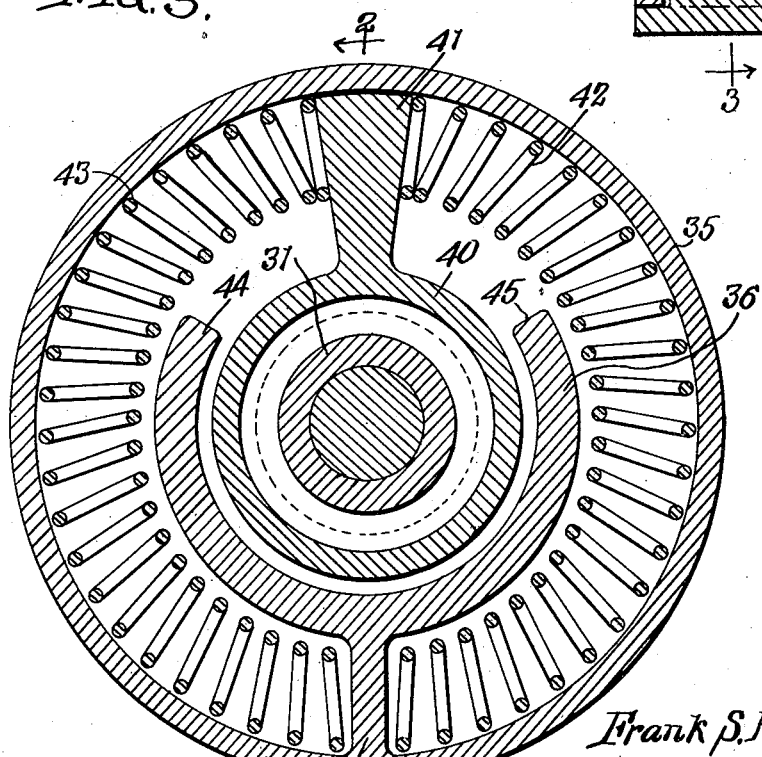
Inventor
Frank S. Hooker,
By
Attorneys

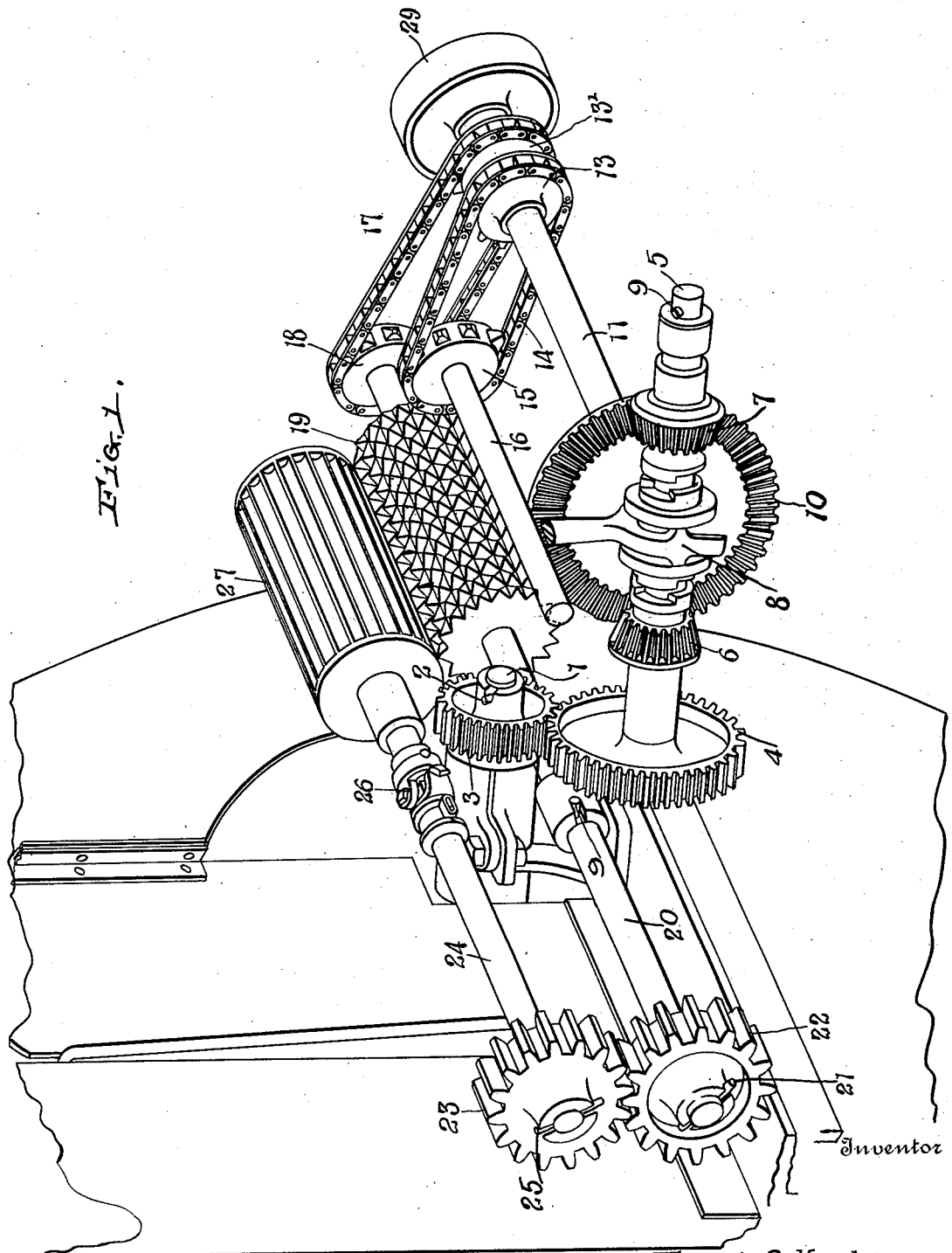

UNITED STATES PATENT OFFICE.

FRANK S. HOOKER, OF LANCASTER, OHIO, ASSIGNOR TO SWAYNE ROBINSON & CO., OF RICHMOND, INDIANA, A CORPORATION OF INDIANA.

SHOCK-ABSORBING DEVICE.

1,185,671. Specification of Letters Patent. Patented June 6, 1916.

Application filed January 13, 1916. Serial No. 71,836.

*To all whom it may concern:*

Be it known that I, FRANK S. HOOKER, a citizen of the United States, residing at Lancaster, in the county of Fairfield and State of Ohio, have invented certain new and useful Improvements in Shock-Absorbing Devices, of which the following is a specification, reference being had therein to the accompanying drawing.

This invention relates to a shock absorbing device, especially adapted for use in connection with silage cutters, but is not limited to this use as it may be used in connection with machinery of many kinds. In silage cutting machines the cutting knives revolve very rapidly and it is desirable in feeding corn to the cutter to reverse the feeding mechanism occasionally in order to clear the feeding rolls and to also unchoke the cutter if a very large bundle refuses to pass through the rolls. This has heretofore been a very troublesome thing to do, as frequently reversing at full speed gives an instantaneous and very hard stress on all the driving parts. This often results in the breaking of the shear pins and of the gears.

An object of the invention is to provide a shock absorbing device so organized or arranged that the strains upon the gearing, and shear pins which hold the various gears in place, are practically eliminated.

Another object of the invention is to provide a shock absorbing device which is so constructed that it will be more durable and dependable, and which will operate to give maximum efficiency independently of the operator.

In the accompanying drawings, Figure 1 is a perspective view of the gears, shafts, shear pins, etc., of a silage cutter with my shock absorbing device attached thereto, parts of the mechanism being omitted for clearness; Fig. 2 is a vertical section of the shock absorbing device on the line 2—2 of Fig. 3, looking in the direction of the arrows; and Fig. 3 is a vertical section of the same on the line 3—3 of Fig. 2, looking in the direction of the arrows.

In the embodiment of the invention here shown a shaft 1 which is rotated by a suitable source of power, not shown, has attached to it by means of a shear pin 2 a gear 3. This gear meshes with a gear 4 fixed to a shaft 5 which is suitably mounted in bearings on the frame of the machine, the bearings and frame being omitted for the sake of clearness. Loosely mounted upon the shaft 5 are a pair of bevel gears 6 and 7. These bevels are adapted to be fixed to the said shaft 5 by means of a reversing clutch 8 which may be of any construction. Shear pins for holding the parts together are indicated by the numeral 9. The bevel gears 6 and 7 mesh with a gear 10 which is fixed to a shaft 11. It will be seen that when the clutch is in the position shown in Fig. 1 the shaft 11 will not rotate. Rotation, however, can be imparted to the shaft 11 in either direction by shifting the clutch one way or the other to fix either of the gears 6 or 7 to the shaft 5. Loosely mounted upon the shaft 11 is a sleeve 12 to which is fixed a pair of sprocket wheels 13 and 13'. Upon the sprocket wheel 13 is a sprocket chain 14 which passes around a second sprocket 15. The sprocket 15 is fixed to a shaft 16 mounted in suitable bearings, not shown, and adapted to rotate a conveying mechanism which is omitted for the sake of clearness. The sprocket 13' drives a sprocket chain 17 which meshes with a sprocket 18 which rotates a roll 19 mounted upon the shaft 20. At the opposite end of this shaft 20 is a shear pin 21 which holds a feed roll gear 22 in place. This feed roll gear meshes with an upper feed roll gear 23 mounted upon the shaft 24 and fixed thereto by a shear pin 25. The shaft 24 has a universal joint therein, as indicated at 26, and is adapted to rotate the upper roll 27. The sleeve 12, above described, is rotated by the shaft 11 through a jaw clutch connection 28 with the shock absorbing device, indicated generally at 29, Fig. 1. This shock absorbing device 29 may be located anywhere within the mechanism, but for the sake of clearness, the mechanism between the source of power and the shock absorbing device will be designated the driving mechanism and the mechanism the other side of the shock absorbing device will be designated the driven mechanism. The reversing mechanism or clutch is located in the driving mechanism.

The shock absorbing device shown in Figs. 2 and 3 comprises a member 30 which is fixed to the sleeve 12 by the jaw clutch connection 28, the member 30 being freely rotatable and loose on the shaft 11. The second member of the shock absorbing device comprises a sleeve 31 having a radially extending plate thereon, indicated at 32, the plate being located intermediate the ends of the said sleeve. The sleeve 31 and shaft 11 have a transverse opening 33 therethrough in which is located the pin 34 for fixing the second member to the shaft 11. The second member has a circumferential flange 35 which is at right angles to the plate 32 and projects inwardly toward the member 30. A similar flange 36 is situated inside of and concentric with the flange 35. A portion of this flange 36, however, is cut away, as clearly shown in Fig. 2. The flanges 35 and 36 are connected by a radial flange 37 which constitutes an abutment. The member 30 comprises a radial plate 38 with an opening 39 adapted to receive the shaft 11, as described above. Projecting from the intermediate portions of the plate 38 and concentric with the circumference thereof is a circular flange 40. This flange projects between the sleeve 31 and the flange 36 of the second member of the shock absorbing device. Projecting from the inner surface of the plate 38 and extending between the flange 40 and the circumference of said plate is a radial flange 41 constituting an abutment. A coiled spring 42 held in place by the flanges 35 and 36 abuts against the adjacent sides of the flanges 37 and 41. A similar spring 43, likewise held in place by the flanges 35 and 36, abuts against the other adjacent faces of the flanges 37 and 41. The ends of the flange 36 formed by cutting away the same constitute stops or abutments 44 and 45 for limiting the relative rotation of the two members of the shock absorbing device. It will be seen that if the member which is fixed to the shaft 11 is rotated clockwise the spring 43 will exert a pressure upon the member 41 and will be compressed between the abutments 37 and 41 until the abutment 44 engages with the abutment 41 and the parts will then rotate together clockwise. When it is desired to reverse the mechanism the clutch member is thrown in the proper direction and the reverse operation takes place in the shock absorbing device. The springs form a cushion either for the reverse or forward movement. Through this cushioning effect all the driving mechanism and feeding parts are relieved from the sharp instantaneous blow which would otherwise be delivered by reversing at full speed.

The shear pins are used to prevent the breakage of the more expensive portions of the machine and consist simply of small solid pieces of round steel which can be obtained anywhere and quickly put in place. However, in the machines heretofore used the strains due to reversing have resulted in many of the pins breaking and caused a great deal of delay and loss of time in putting these shear pins in place again. By the shock absorbing arrangement above described this difficulty has been obviated.

While I have shown and described one embodiment of my invention it will be understood that this has been chosen for the purposes of illustration only and that I do not desire to be limited to the details of construction shown and described, for obvious modifications will occur to a person skilled in the art.

Having thus fully described my invention, what I claim as new and desire to secure by Letters Patent, is:—

1. In a mechanism of the character described, feeding devices, a driving mechanism therefor, reversing mechanism associated with said driving mechanism and including clutch mechanism, and a shock absorbing device distinct from said reversing mechanism and interposed in said driving mechanism between the clutch mechanism and said feeding devices, said shock absorbing device being operative when the feeding devices are started and reversed.

2. In a machine of the character described, feeding devices, a driving mechanism therefor, said driving mechanism comprising a shaft, reversing mechanism for said shaft associated with one end thereof, a shock absorbing member associated with the other end of said shaft, a coöperating shock absorbing member rotatably mounted on said shaft, and a driving connection between said second shock absorbing member and said feeding devices.

3. In a shock absorbing device, a pair of relatively rotatable members, each member being provided with an abutment, cushioning devices located between said abutments, and stops located upon one of said members upon each side of the abutment of the other member, said stops and a portion of said last-mentioned abutment coöperating to limit the relative movement of the members.

4. In a shock absorbing device, a pair of relatively rotatable members, an abutment fixed to each member, a pair of coiled springs arranged around the circumferences of the members with their ends engaging the abutments, spaced stops on one of said members arranged to engage a portion of the other member to prevent the undue compression of the springs and make the members rotate in the same direction, and means to retain said springs in place.

5. In a shock absorbing device, a member having a pair of concentric flanges, one of said flanges being cut away, the ends formed by such cutting away constituting stops, a flange connecting the first-mentioned flanges and forming an abutment, a second member rotatable relatively to the first-mentioned member and having a radial flange thereon located between said stops and constituting an abutment, and cushioning devices situated between said abutments and between the concentric flanges of the first-mentioned member, whereby the members may have movement relative to each other, said springs cushioning the relative movement before said members are forced to rotate in the same direction.

6. In a cushioning device, a member comprising a sleeve fixed to the driving shaft, a pair of flanges concentric with said sleeve, the flange adjacent said sleeve being broken away, the ends thereof constituting stops, and a radial abutment extending between said concentric flanges, a second member having a circular flange located inside of its circumference and projecting between the said sleeve and cut away flange, said second member also having a radial abutment extending between the circular flange and its circumference and located between the stops of the cut away flange, and springs extending between said abutments and located between the flanges on the first-mentioned member.

In testimony whereof, I affix my signature.

FRANK S. HOOKER.